Figure 2:
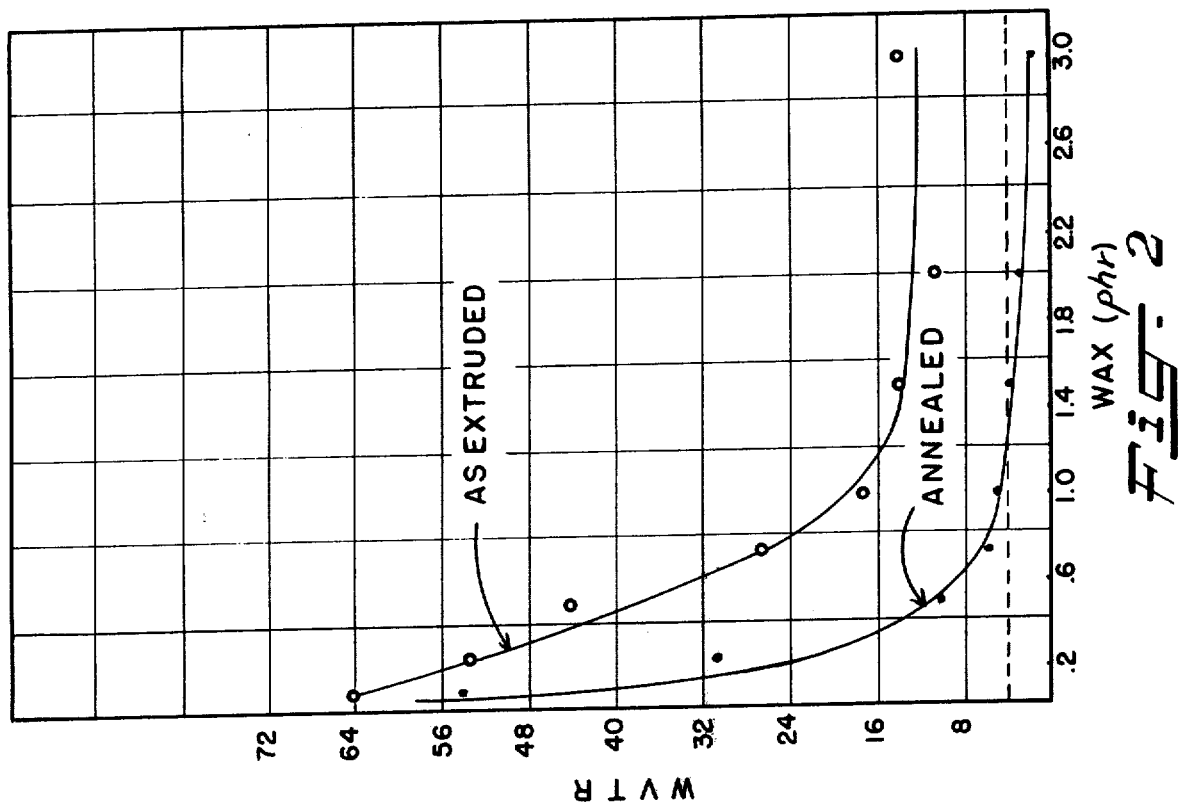

United States Patent [19]
Bennington et al.

[11] 3,875,164
[45] Apr. 1, 1975

[54] HIGH MOISTURE BARRIER POLYVINYL CHLORIDE FILM AND PROCESS FOR MAKING THE SAME

[75] Inventors: Robert L. Bennington, Chester; John T. Massengale, West Chester, both of Pa.

[73] Assignee: FMC Corporation, Philadelphia, Pa.

[22] Filed: May 14, 1973

[21] Appl. No.: 359,774

[52] U.S. Cl. .......................................... 260/28.5 D
[51] Int. Cl. ............................................ C08f 45/52
[58] Field of Search .............................. 260/28.5 D

[56] References Cited
UNITED STATES PATENTS

| | | | |
|---|---|---|---|
| 3,284,389 | 11/1966 | Kane | 260/28.5 D |
| 3,326,831 | 6/1967 | Autges | 260/28.5 D |
| 3,542,710 | 11/1970 | Glatti | 260/28.5 D |
| 3,696,067 | 10/1972 | Trofimow | 260/28.5 D |

*Primary Examiner*—Joseph L. Schofer
*Assistant Examiner*—Samuel L. Fox

[57] ABSTRACT

A melt-extruded, self-supporting, plasticized, uncoated polyvinyl chloride film containing from about 0.5 to 4.0 parts per hundred, based upon the weight of the polyvinyl chloride present, of a moisture-proofing paraffin wax which impacts to the film a high resistance to moisture transmission, particularly after annealing of the film.

10 Claims, 2 Drawing Figures

HIGH MOISTURE BARRIER POLYVINYL CHLORIDE FILM AND PROCESS FOR MAKING THE SAME

Commercially available polyvinyl chloride films generally exhibit a high degree of flexibility, transparency and gloss, an attractive appearance, and good elongation and tenacity characteristics, and are therefore well adapted for many packaging applications. However, lacking high moisture barrier characteristics, such films have found little use in packaging baked goods and sweet doughs, candy, frozen foods and other products which suffer in quality and/or appearance when exposed to an excess or experience a loss of moisture. Notwithstanding the attention received, this deficiency has not been remedied without some sacrifice in other desirable film properties and/or without resorting to complicated and expensive production procedures.

Solvent coatings containing paraffin wax are employed in moistureproofing regenerated cellulose films and it might be expected that, by this technique or by the use of formulations containing such wax, moistureproof polyvinyl chloride films could also be obtained. This expectation has been dispelled by U.S. Pat. No. 2,435,464 which explains that solvent coatings are inapplicable to vinyl films, and that films prepared from vinyl resin formulations containing varying proportions of different paraffin waxes exhibited substantially no improved moisture resistance.

Mentioned in this patent is that somewhat better results were secured when the waxes were blended into vinyl formulations by means of a rosin but that this technique must be carefully carried out and the proportions of the ingredients must be adjusted in accordance with the thickness of the film proposed to be made. Absent, however, is any indication of the blending techniques, the proportions of ingredients, the process by which the films were made or the results which were achieved.

U.S. Pat. No. 2,445,727 not only confirms that polyvinyl chloride films containing paraffin waxes show no improvement in moisture transmission resistance but that, in some cases, the presence of such waxes was actually a detriment with respect to this particular characteristic. This patent does disclose that vinyl formulations, plasticized with butadiene-acrylonitrile type elastomers and containing paraffin waxes, may be cast into clear films. However, mixtures of solvents or solvents and resinous gums are required, and satisfactory films can be made only by utilizing expensive solution casting techniques.

A primary object of this invention is the provision of a new or improved and more satisfactory melt-extruded, self-supporting polyvinyl chloride film having high resistance to moisture transmission.

Another object of this invention is to provide a melt-extruded, self-supporting plasticized, uncoated, paraffin wax-containing polyvinyl chloride film having desirable characteristics comparable to conventional polyvinyl chloride films and which further possess a high degree of resistance to moisture transmission.

Still another object of this invention is to provide a melt extruded self-supporting, plasticized, uncoated polyvinyl chloride film having high moisture barrier properties, particularly after being annealed.

A further object is the provision of a melt extruded, self-supporting uncoated, annealed polyvinyl chloride film having high moisture barrier properties which is formed of a plasticized polyvinyl chloride formulation containing a paraffin wax.

Figure 1:
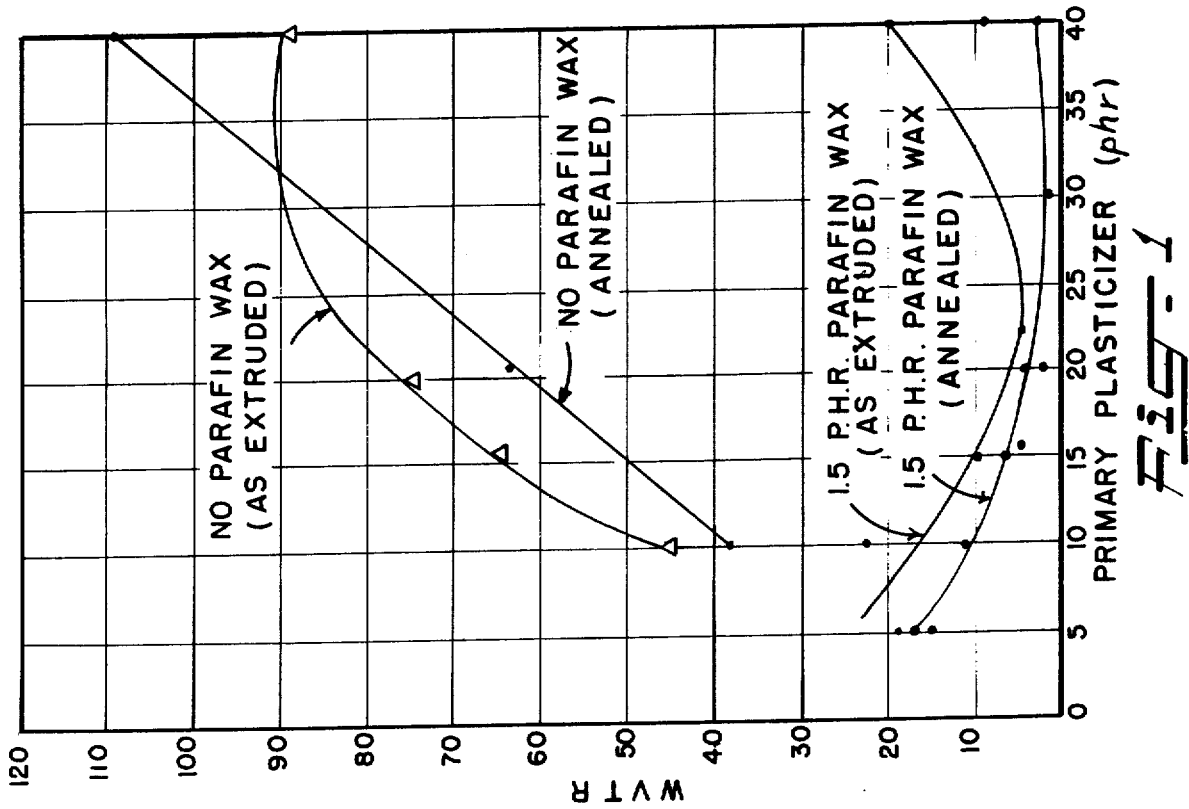

In the drawings,

FIGS. 1 and 2 are graphs illustrating the moisture vapor transmission characteristics of conventional polyvinyl chloride films and films formed in accordance with the present invention.

These and other objects are accomplished in accordance with the present invention by a melt extruded, self-supporting plasticized, uncoated polyvinyl chloride film having a high resistance to moisture transmission, particularly after being annealed. More specifically, the melt-extruded, self-supporting, film of this invention is formed by a continuous extrusion process, using a plasticized polyvinyl chloride resin formulation containing from about 0.5 to 4.0 parts per hundred of a moistureproofing paraffin wax, based upon the weight of polyvinyl chloride present.

The plasticizer employed in the formulation may range from about 7 to 55 parts per hundred, based upon the polyvinyl chloride present, and includes both primary and secondary plasticizers in a ratio of from 1.8/1 to 3.2/1. As plasticizers, the so-called "secondary plasticizers" are less efficient, yet as is generally known, such secondary plasticizers do serve other functions, as for example, as hydrogen chloride scavengers, and thus are essential in the formulation for satisfactory practice of the present invention.

Wax blending agents for assuring film clarity, particularly when high levels of paraffin wax are used, heat stabilizers, extrusion lubricants, toners and the like may also be incorporated within the formulation where necessary or desired and have no apparent detrimental effect upon the moisture barrier characteristic of the resulting film.

In the process employed in making the film of the present invention a formulation, containing polyvinyl chloride resin, primary and secondary plasticizers, paraffin wax, a wax blending agent and any other necessary additives, is rendered molten and extruded as a film through a suitable die. Preferably, a tubular die is used with a gas under pressure being introduced into and contained within the tubular film as it issues from the extrusion die to at least maintain the same in an expanded condition and, more desirably, to expand such film so as to thin the wall areas thereof which are still at a temperature above its orientation temperature range.

After expansion, the tubular polyvinyl chloride film may be quenched, then reheated to a temperature within its orientation temperature range and stretched to orient the molecules thereof at least along one of its axial directions. The reheated portions of the tubular film may be oriented in a transverse direction by simply expanding the same laterally under the pressure of the gas contained therein, and may be oriented longitudinally by being withdrawn from the location of reheating at a faster rate than its delivery thereto.

The polyvinyl chloride film may be annealed immediately after its orientation by heating the film to a temperature above its orientation temperature range while maintaining such film under sufficient tension as to permit, at most, only a minimal shrinkage thereof, and thereafter cooling the film to a temperature below its orientation temperature range while it is maintained in its tensioned condition. As will be more apparent hereafter, annealing of the wax-containing polyvinyl chloride films provides for a drastic reduction in their moisture-vapor transmission characteristics. While a complete explanation for this result has not yet been established, it is believed that the heat applied to the films during the annealing step may induce the contained wax to further blend and perhaps assume a layer formation of great uniformity on the surface of such annealed film.

In the formulation employed in the present invention the quantities blended with a polyvinyl chloride resin are set forth in parts per hundred (phr), based upon the weight of the polyvinyl chloride resin present.

As referred to herein the "orientation temperature range" is the range of temperatures within which orientation of the polyvinyl chloride molecules may be readily achieved by stretching, and extends from and generally slightly above the second order phase transition temperature of the polyvinyl chloride resin to below a temperature at which relaxation of the orientation effect, which is achieved by stretching, occurs so rapidly that the film retains no significant orientation once stretching ceases. While the orientation temperature range employed may vary with different polyvinyl chloride formulations, temperatures of from about 175° to 240°F are generally suitable.

Annealing or heat-setting of the oriented polyvinyl chloride film may be achieved by heating such film to a temperature within the range of from about 212° to 330°F while it is maintained under tension. Temperatures below 212°F will generally not provide for the desired annealing, while temperatures approaching and exceeding 330°F necessitate extreme caution to avoid melting of the film. At practical commercial speeds, temperatures of from 240° to 270°F are most appropriate.

While less desirable, the oriented polyvinyl chloride film may be annealed after being snugly applied about an article which is to be packaged. In this instance the article or its carrier must be sufficiently rigid to permit only minimal change in the film dimensions during the heating and subsequent cooling of the film.

The duration of heat application during film annealing will vary with such factors as the temperatures employed, melting temperature of the film, film orientation, etc., and may range from less than a second to perhaps 5 minutes or more.

Any commercial polyvinyl chloride resins of at least 90 mole percent of vinyl chloride and having film-forming properties can be employed in making the film of the present invention. Typical of such resins are EXON 9269, manufactured by Firestone Chemical Company, ESCAMBIA 3250, manufactured by Escambia Chemical Corporation and DIAMOND 450, produced by Diamond Alkali Company. In addition to homopolymer polyvinyl chloride resins, copolymers of vinyl chloride containing minor amounts of other polymerizable monomers, such as vinyl acetate, vinylidene chloride, acrylonitrile, and the like, may be used in the formulation employed in producing the film of the present invention.

A variety of plasticizers may be used in the formulation including, as primary plasticizers, di(2-ethylhexyl) adipate, di(2-ethyl-hexyl) phthalate, dibutyl phthalate, dibutyl sebecate, and, as secondary plasticizers, epoxydized soy bean oil, such as, PARAPLEX G-62 supplied by Rohm and Haas Company.

The total plasticizer content in the formulation may be varied from about 7 to about 55 parts per hundred, with a formulation containing lesser amounts of plasticizer, yet within the specified range, providing a film reduced flexibility. As the total plasticizer content in the formulation is reduced below 7 parts per hundred and less, the films become more rigid and exhibit poor physical characteristics, and particularly tensile strength, and the formulation itself is different to extrude continuously. Incorporating more than about 55 parts per hundred total plasticizer in the formulation results in tacky films having poor tensile properties.

With the total plasticizer maintained within the range specified, reducing the ratio of primary-to-secondary plasticizer in the formulation to less than 1.8 to 1 generally provides for unsatisfactory films because of plasticizer exudation onto the film surfaces. Similarly, increasing the amount of primary plasticizer in the formulation to provide a primary-to-secondary plasticizer ratio which exceeds a ratio of about 3.2 to 1 provide films which also are unsatisfactory, being extremely soft and tacky.

Of particular significance is that only moistureproofing paraffin waxes, such as, SUNOCO 4412 and 5512 manufactured by the Sun Oil Company, are suitable for use in providing the film of the present invention. Found to be completely unsatisfactory are microcrystalline waxes (ESTAWAX 20 made by Petrolite Corporation), microcrystalline waxes containing 2% butyl rubber (MULTIWAX ML 445 made by Petroleum Specialties, Inc.), and high molecular weight polyethylene oxides (CARBOWAX 1000 and 6000 produced by Union Carbide Corporation).

The paraffin waxes employed preferably melt at a temperature ranging from about 125° to 200°F, and are incorporated into the formulation in an amount ranging between 0.5 to 3.0 to 4.0 parts per hundred and more desirably from 1.0 to 3.0 parts per hundred. Less than about 0.5 parts per hundred of paraffin wax in the polyvinyl chloride formulation provides for films having no significant decrease in moisture vapor transmission rate (MVTR), while the use of from 3.0 to 4.0 parts per hundred and more of the paraffin wax has an increasingly adverse effect upon the extrusion operation itself.

The presence of the paraffin wax in the formulation within the limits specified creates no unusual extrusion problems, nor do the resulting films exhibit tensile or elongation properties different from those of conventional manufacture. Films formed from a formulation having from 3.0 to 4.0 and more of the paraffin wax may exhibit some haze which can be minimized, if not completely eliminated, by including in the formulation a wax blending agent, preferably in a 1 to 1 ratio with the paraffin wax. Satisfactory blending agents which are compatible with the other ingredients of the formulation include terpenes, polyterpenes and polystyrenes, as for example, PICCOTEX 100, an alpha methyl styrene-vinyl toluene copolymer, produced by Penn Industrial Chemical Company.

Conventional heat-stabilizers may be used in the formulation, including metal stearates, such as calcium-zinc stearate (MARK QED produced by Argus Chemical Company) and barium-cadmium or dioctyl tins. A variety of extrusion lubricants can be used, including stearic acid, low molecular weight polyethylene and glycerol monostearate. Commercially available toners, which are organic dyes on an aluminum hydroxide base, may also be added to the formulation to impart a desired color to the extruded film.

For a better understanding of the present inention, reference is made to the examples as hereafter set forth. In all of the examples, the polyvinyl chloride formulations were rendered molten and extruded as continuous tubular films using conventional equipment and well known extrusion practices. A two stage screw type extruder having a three zone temperature controlled barrel was employed, with typical extrusion conditions as follows:

Extruder barrel temperatures:
Zone 1                 320°F
Zone 2                 340°F
Zone 3                 350°F
Die Adaptor            350°F
Extrusion Die          360°F
Screen Pack            80 to 40 mesh
Blow-up ratio of
extruded tubular       3.5 to 1
film samples were made after a 24 hour period and, in the following tables and accompanying charts, are given in grams per square meter per 24 hours per mil ($g/m^2/24$ hrs.)

TABLE I

| Formulation | Film Sample | | |
|---|---|---|---|
| | A | B | C |
| Polyvinyl chloride resin Diamond 450 (in pounds) | 100 | 100 | 100 |
| Organotin Heat Stabilizer | 1.5 | 1.5 | 1.5 |
| Dioctyl Phthalate (Primary Plasticizer) | 10 | 20 | 40 |
| "Paraplex" G-62 (Secondary Plasticizer) | 5 | 5 | 5 |
| Extrusion Lubricant | 0.15 | 0.15 | 0.15 |
| Paraffin Wax Sunwax 4412 | — | — | — |
| MVTR | | | |
| As extruded | 44.5 | 77.2 | 88.9 |
| Annealed | 38.5 | 62.5 | 109.0 |

TABLE II

| Formulation | Film Sample | | | | | | | | |
|---|---|---|---|---|---|---|---|---|---|
| | D | E | F | G | H | I | J | K | L |
| Polyvinyl chloride resin Diamond 450 (in pounds) | 100 | 100 | 100 | 100 | 100 | 100 | 100 | 100 | 100 |
| Organotin Heat Stabilizer | 1.5 | 1.5 | 1.5 | 1.5 | 1.5 | 1.5 | 1.5 | 1.5 | 1.5 |
| Dioctyl Phthalate (Primary Plasticizer) | 16 | 16 | 16 | 16 | 16 | 16 | 16 | 16 | 16 |
| "Paraplex" G-62 (Secondary Plasticizer) | 5 | 5 | 5 | 5 | 5 | 5 | 5 | 5 | 5 |
| Extrusion Lubricant | 0.15 | 0.15 | 0.15 | 0.15 | 0.15 | 0.15 | 0.15 | 0.15 | 0.15 |
| Paraffin Wax Sunwax 4412 | 0.1 | 0.25 | 0.5 | 0.75 | 1.0 | 1.5 | 2.0 | 3.0 | 4.0 |
| MVTR | | | | | | | | | |
| As extruded | 64.0 | 52.9 | 44.8 | 27.0 | 17.2 | 13.7 | 11.1 | 13.9 | 17.2 |
| Annealed | 53.7 | 31.5 | 10.4 | 5.9 | 4.7 | 4.5 | 3.0 | 1.3 | 2.7 |

TABLE III

| Formulation | Film Sample | | | | | |
|---|---|---|---|---|---|---|
| | M | N | O | P | Q | R |
| Polyvinyl chloride resin Diamond 450 (in pounds) | 100 | 100 | 100 | 100 | 100 | 100 |
| Organotin heat stabilizer | 1.5 | 1.5 | 1.5 | 1.5 | 1.5 | 1.5 |
| Dioctyl Phthalate (Primary Plasticizer) | 5 | 10 | 15 | 20 | 30 | 40 |
| "Paraplex" G-62 (Secondary Plasticizer) | 5 | 5 | 5 | 5 | 5 | 5 |
| Extrusion Lubricant | 0.15 | 0.15 | 0.15 | 0.15 | 0.15 | 0.15 |
| Paraffin Wax Sunwax 4412 | 1.5 | 1.5 | 1.5 | 1.5 | 1.5 | 1.5 |
| MVTR | | | | | | |
| As extruded | 18.7 | 22.4 | 9.7 | 4.0 | 16.6 | 8.6 |
| Annealed | 16.8 | 11.2 | 6.5 | 2.2 | 1.1 | 2.2 |

After extrusion, expansion and quenching, the films were reheated and stretched 3.5 times their original dimensions to orient the same along biaxial directions. Immediately thereafter the films were annealed by being maintained at a temperature of about 250°F for a period of 10 seconds while preventing any substantial change in its dimensions, and then cooled to the temperature of the ambient atmosphere.

Moisture vapor transmission rates (MVTR) were determined by disposing the sample films across the mouths of cups containing known weights of calcium chloride and subjecting the films to an atmosphere maintained at 100°F and 95% relative humidity. Measurements of the moisture transmitted through the film As is apparent from Table I and the upper portion of FIG. 1, the moisture vapor transmission rates of conventional, as extruded, polyvinyl chloride films (containing no paraffin wax) are improved, yet are undesirably high, as the total plasticizer content is reduced. Some additional improvement in this characteristic is provided by annealing of such films, except with films having relatively high plasticizer contents where annealing is actually a detriment.

Table II and FIG. 2 illustrate well the merits of the present invention. While films containing more than 4.0 parts per hundred of paraffin wax have highly desirable moistureproofing properties, formulations containing such wax contents are extremely difficult to extrude continuously. Of particular significance is the drastic reduction in moisture transmission rates of the films after annealing.

Table III and the graphs at the lower portion of FIG. 1 both establish that, contrary to the data set forth in Table I, a reduction of the plasticizer content of the film of the present invention does not provide for any improvement in the moistureproof characteristic of the film nor does such characteristic suffer in an annealed film having a relatively large plasticizer content.

It is to be understood that changes and variations may be made without departing from the spirit and scope of the invention as defined in the appended claims.

We claim:

1. A melt-extruded, self-supporting, plasticized, uncoated polyvinyl chloride film having a high resistance to moisture transmission, said film containing from about 0.5 to 4.0 parts per hundred, based upon the weight of the polyvinyl chloride present, of a moistureproofing paraffin wax having a melt temperature within the range of 125°F. to 200 20 .

2. A film as defined in claim 1 containing from about 7 to 55 parts per hundred of total plasticizer, based upon the weight of the polyvinyl chloride present.

3. A film as defined in claim 2 containing both primary and secondary plasticizers, said primary and secondary plasticizers being present in a ratio ranging from 1.8/1 to 3.2/1.

4. A film as defined in claim 1 further including a paraffin wax blending agent.

5. A film as defined in claim 2 further including from 0.5 to 4.0 parts per hundred, based upon the weight of the polyvinyl chloride present, of a paraffin wax blending agent.

6. A film as defined in claim 3 further including from 0.5 to 4.0 parts per hundred, based upon the weight of the polyvinyl chloride present, of a paraffin wax blending agent.

7. A film as defined in claim 6 wherein said film is in an annealed condition.

8. A film as defined in claim 1 wherein said film is in an annealed condition.

9. A film as defined in claim 8 containing from about 7 to 55 parts per hundred of total plasticizer, based upon the weight of the polyvinyl chloride present.

10. A film as defined in claim 9 further including a paraffin wax blending agent which is present in generally a 1 to 1 ratio with said moistureproofing paraffin wax.

* * * * *